(12) United States Patent
Watson

(10) Patent No.: US 11,250,101 B2
(45) Date of Patent: *Feb. 15, 2022

(54) TAG AGGREGATOR

(71) Applicant: Oath Inc., New York, NY (US)

(72) Inventor: Ben Watson, Carp (CA)

(73) Assignee: VERIZON MEDIA INC., New York, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/411,751

(22) Filed: May 14, 2019

(65) Prior Publication Data

US 2019/0266211 A1 Aug. 29, 2019

Related U.S. Application Data

(60) Continuation of application No. 14/635,601, filed on Mar. 2, 2015, now Pat. No. 10,289,746, which is a continuation of application No. 13/362,777, filed on Jan. 31, 2012, now Pat. No. 8,972,850, which is a division of application No. 11/960,619, filed on Dec. 19, 2007, now Pat. No. 8,140,963.

(51) Int. Cl.
*G06F 16/958* (2019.01)
*G06F 16/951* (2019.01)

(52) U.S. Cl.
CPC .......... *G06F 16/972* (2019.01); *G06F 16/951* (2019.01); *G06F 16/958* (2019.01)

(58) Field of Classification Search
None
See application file for complete search history.

(56) References Cited

U.S. PATENT DOCUMENTS

| | | | | |
|---|---|---|---|---|
| 6,314,451 B1* | 11/2001 | Landsman | ............. | G06Q 30/02 709/203 |
| 6,393,407 B1* | 5/2002 | Middleton, III | ....... | G06Q 30/02 705/14.73 |
| 7,685,270 B1* | 3/2010 | Vermeulen | .......... | H04L 41/5009 709/224 |
| 2007/0271145 A1* | 11/2007 | Vest | ................... | G06Q 30/0277 705/14.41 |
| 2007/0282825 A1* | 12/2007 | Toub | ................... | G06F 16/9535 |
| 2008/0040653 A1* | 2/2008 | Levine | ................... | G06Q 30/02 715/205 |
| 2008/0295119 A1* | 11/2008 | Muscarella | ............. | G06F 9/465 719/330 |
| 2009/0070190 A1* | 3/2009 | Gorty | ................. | G06Q 30/0241 705/14.6 |

OTHER PUBLICATIONS

Brambilla, Marco, Stefano Ceri, Mario Passamani, and Alberto Riccio. "Managing asynchronous web services interactions." In Proceedings. IEEE International Conference on Web Services, 2004., pp. 80-87. IEEE, 2004. (Year: 2004).*

* cited by examiner

*Primary Examiner* — Frank D Mills
(74) *Attorney, Agent, or Firm* — Cooper Legal Group, LLC

(57) ABSTRACT

A system for managing tags on a web page is disclosed. Tags are managed by implementing primary and secondary tags. The secondary tags are aggregated to provide network and tag management efficiency.

20 Claims, 6 Drawing Sheets

-PRIOR ART-

TAG AGGREGATOR

RELATED APPLICATIONS

The present patent document is a continuation of U.S. patent application Ser. No. 14/635,601, filed Mar. 2, 2015, issued as U.S. Pat. No. 10,289,746 on May 14, 2019, which is a continuation of U.S. patent application Ser. No. 13/362, 777, filed Jan. 31, 2012, issued as U.S. Pat. No. 8,972,850 on Mar. 3, 2015, which is a division of U.S. patent application Ser. No. 11/960,619, filed Dec. 19, 2007, issued as U.S. Pat. No. 8,140,963 on Mar. 20, 2012. U.S. patent application Ser. No. 14/635,601, U.S. patent application Ser. No. 13/362,777, and U.S. patent application Ser. No. 11/960, 619 are hereby incorporated herein in their entirety by this reference.

BACKGROUND

1. Technical Field

This disclosure relates to managing the content of a web site. More specifically, this disclosure relates to managing tags implemented for management of third party reporting services on a web site.

2. Background

A tag is generally a piece of data representative of other information. For example, referring to an advertisement on a web page, the link within an advertisement may be referred to as a tag or the data representative while the data, once the link is selected, is the other information represented by the tag. Tags represent a wide area of data and data types such as a web link, a media file or an image. A collection of data for a specific topic may be represented by a tag. When a tag on a web page is clicked, other content may appear. For example, a web page hosted on a web server that supports tagging may include the tags United States news, United Kingdom news, France news, politics, and law. Someone viewing that webpage can easily tell the web page relates to news and politics in several countries by viewing the tags. The tags are usually displayed as a listing on the web page where each tag that is displayed is a web link. Once the link is activated, all of the web pages that use the tag activated may be displayed. Thus, in the example above, a user can easily find all of the pages that relate to news in the United States.

Links on a web site may also have tags that are seemingly unrelated to the link. For example, if a user clicks to purchase ski equipment from a web site, an advertisement for ski vacations may be displayed. Similarly, links or advertisements of a retailer with a web site may be tagged so that once a user accesses the web site or certain products on the retailer's web site, pop up advertisements of other businesses offering related services may appear. Alternatively, search result listings may have tags associated with them. Tags can refer to any information that is or becomes associated with a search or search results. Tags may also be generated by search engine optimization tools or search engine optimization agencies. Tags may be attributed to a web page search. Traffic may be driven to a website in exchange for a share of the revenue. The host that is driving the traffic may have a tag on the web page. A tag can also store user preferences and other related information. Thus, tags can be used in countless ways within web sites.

Tags are becoming increasingly popular in website design. Tags have many purposes. One purpose is to manage traffic to and from a website. In general, web pages include at least one tag and as many as ten or more. A web page that includes advertising includes additional tags, including a set of tags for the content of the web page and additional tags related to the advertising on the web page. Advertisements may include tags of a specific content, specific to an advertisement campaign or specific to a domain. Tags may be used to track people or track traffic to the website. A tag may be based on a user's behavior so it may include personalization settings. As web sites become more and more complex, sometimes having hundreds or thousands of links within a single web site, the number of tags on the page also increases and the management of the tags becomes more and more complex.

Tags are provided to a web browser on a personal computer with the rest of the information on a web page requested by the browser. Once a web page is loaded on a web browser, every tag on the website must retrieve its URL successfully in order for the web page to complete loading. Thus, web pages are taking longer and longer to load. If the network connection isn't optimized, it can take even more time for a web page to load. Tags may store a number of preferences in a cookie on a local computing system. If the temporary internet folder of the computing system is not cleaned regularly, there may be tens of thousands of files to look through. Furthermore, the temporary folder may be searched for additional values about the user or the user's preferences. For each tag on the web page, these values are then sent to the resulting domain. Once each domain sends a confirmation back to the tag, the web page will be loaded. Often, web pages with multiple tags can take a lot of time to load properly. Additionally, if a user has certain internet security settings in place, the web page may not load at all because the security settings will detect the web page traffic as a cross domain call.

Unfortunately, managing tags and keeping track of all of a web site's tags is currently a manual process and can be extremely burdensome. In a typical environment, in order to implement a new tag, an email or other communication is sent to the developer or group of developers by the person or entity interested in adding the new tag. The email may include the requirements for the new tag. The developer or group of developers then proceeds with building the tag based on the requirements given in the email.

Popular commercial web content management systems include BroadVision, provided by BroadVision, Inc., Redwood City, Calif., and Vignette, offered by Vignette Corp., Austin, Tex. Popular open source web content management systems include Drupal, and Joomla, both distributed under the General Public License (GPL) and maintained by a community of users and developers. None of the current web content management systems currently has a standard facility for managing tags on a page, developers often hardcode tags into the templates of a website or into the content of a website. This leads to an additional problem of effectively keeping track of all of the tags and their sources. A given website may have several tags that are unsourced. Determining the source of the unsourced tags can be a website administrator's nightmare. A web developer or administrator cannot simply remove the tag without first determining the source and why the tag was placed on the site. That information may not be readily available.

Another issue with tagging relates to reporting. Several reports are usually generated. For example, the search engine optimizer may have a report, the web site may have a traffic report, the advertisement server may also generate a report and each network where an advertisement is running may also generate a report. These reports usually come in various formats. Furthermore, such reports typically include inconsistent data. For example, a traffic report may state a web site was called 50 times while the report for a web site where the tag is hosted may state the call was made 100 times.

Additionally, most advertisement networks are plagued with what is known as piggyback pixels. Thus, if a call is made to a domain, the domain may make a call to another domain and so on until a successful call is reported back. If any of these calls fails, the web page will fail. Therefore, a need exists for an efficient way to manage tags and report tag usage.

BRIEF SUMMARY

By way of introduction, the embodiments described below include methods and systems for managing tags implemented for the management of third party reporting services on a web site.

In a first aspect, a system for managing tags on a web page is disclosed. Generally, the system includes a tag service running on a tag server. Generally, a tag on a web page is called. The tag service responds to the call and determines and executes specific instructions from the tag. The information from the tag is then divided into one or more asynchronous calls.

In a second aspect, a system for managing tags on a web page is disclosed. The system includes a primary tag module and a secondary tag module in communication with the primary tag module. The secondary tag module is able to request the addition of a secondary tag to the primary tag module. The primary tag module is able to create the secondary tag requested.

In a third aspect, a method for managing tags on a web page is disclosed. First, a user interface is presented in response to a user request. Next, a user requests the addition of a primary tag. The primary tag is created. Next, a user requests the addition of one or more secondary tags. Finally, the secondary tags are aggregated.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The tag and beacon aggregator may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS AND THE PRESENTLY PREFERRED EMBODIMENTS

Reference will now be made to the accompanying drawings, which form a part hereof, and which show, by way of illustration, specific exemplary embodiments. The principles described herein may, however, be embodied in many different forms, and this specification should not be construed to limit the claims. Rather, these embodiments are provided so that the disclosure will be thorough and complete to those skilled in the art.

The internet is becoming the primary means for businesses to target potential customers and sell products or services. The internet is also widely used for a multitude of other reasons such as performing research, keeping up with current events, and travel guides amongst other things. Social networking web sites and resources may be used to connect members having a common interest or to communicate with friends and family. Most people have used or are using the internet for one reason or another. Thus, the internet provides an ideal forum for advertising of products and services.

As used herein, the term Taggregator refers to all of the components and tools relating to the Tag and Beacon aggregator.

Figure 1:
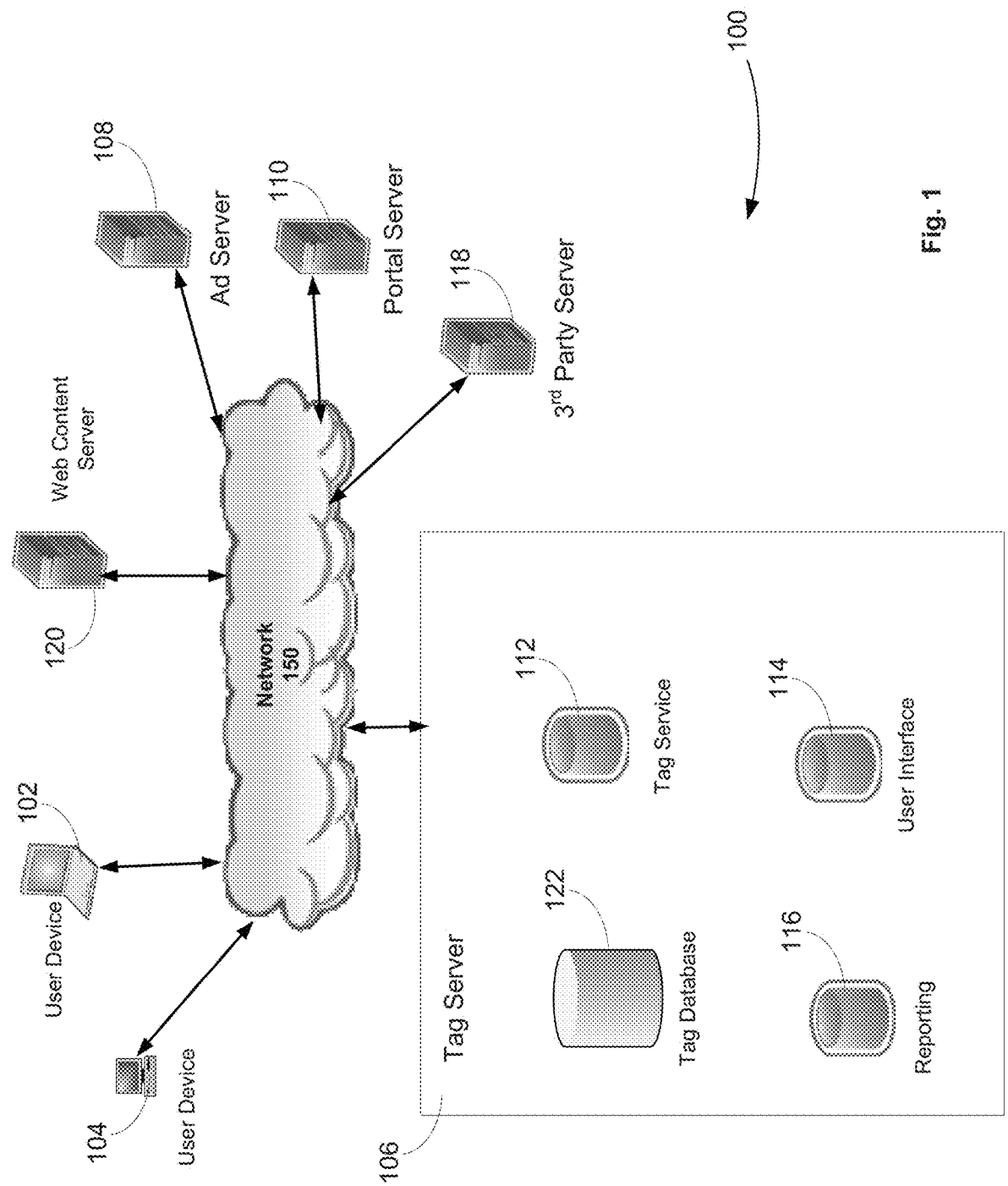
FIG. 1 is a high level view of exemplary system architecture.

FIG. 1 provides a simplified view of a network environment 100. The components of FIG. 1 represent the many elements that can make up the tag management environment. The environment 100 in the exemplary embodiment of FIG. 1 includes an ad server 108, a portal server 110, a third party server 118, a tag server 106, web/content server 120 and user devices 102, 104. The tag server 106 includes a tag service 112, a tag database 122, a user interface module 114 and a reporting module 116. The tag server 106 may be a dedicated server for tagging or a server that includes additional functions outside of tagging.

In FIG. 1, the environment 100 includes the ad server 108, which may provide a platform for selection, optimization, and/or distribution of advertisements. Advertisements may be provided by a portal server 110 and/or a third-party server 118. In FIG. 1, clients are represented by user devices 102, 104. The user devices 102, 104 are depicted as conventional personal computers. However, any suitable user device may be used, such as a wireless or wire line telephone, a cellular telephone, a personal digital assistant, etc. The user devices 102 and 104 are examples of devices used by users who will be managing tags on their website or websites.

Portal server 110, third-party server 118, ad server 108, web/content server 120, tag server 106, and user devices 102 and 104 each represent computing devices of various kinds. Such computing devices may generally include any device that is configured to perform computations and that is capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, user device 104 may be configured to execute a browser application that employs hypertext transfer protocol (HTTP) to request information, such as a web page, from a web server. The illustrated computing devices communicate using a network 150. The network 150 may include any suitable communication network including wire line and wireless networks and may include sub-networks such as local area networks or wide area networks.

A tag server 106 can represent several servers or other devices. The tag server 106 includes a tag service 112, a user interface module 114, and a reporting module 116. The tag service 112 may keep track of and manage tags. When a link on a web page is clicked, the tag service 112 begins executing. The tag service 112 may wait for a tag to be called, collect the information from that tag, and break the information up into the appropriate asynchronous calls that it's going to make and send it to each of the partners or other services that need to be called in order to generate reports. This process is completed latently. Thus, websites can perform at optimum speeds while the tag service 112, also referred as the Taggregator service 112, works in the background and separately from a web page loading by informing other services for tagging purposes versus page load purposes. Currently, these separate entities are tied together such that each entity may avoid taking full responsibility if a problem should occur.

Figure 2:
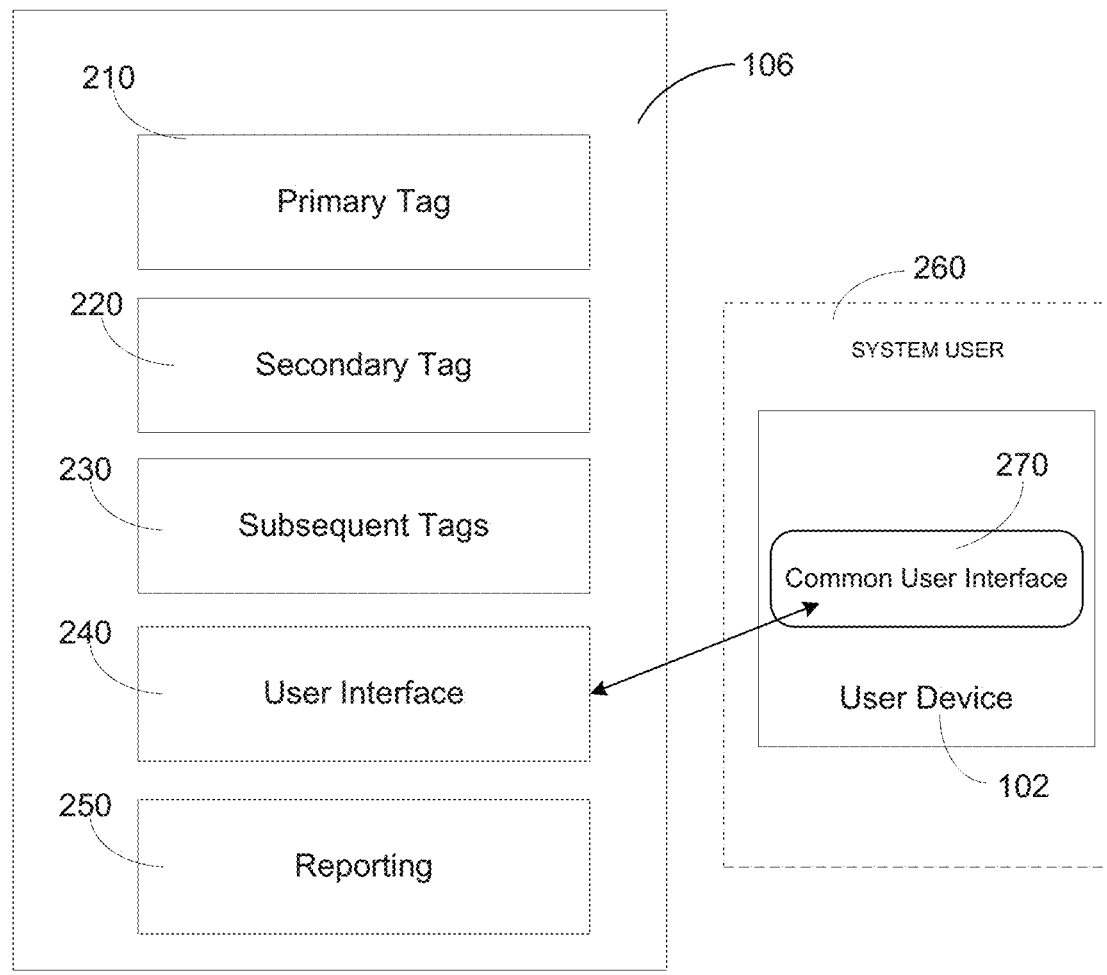
FIG. 2 is a detailed view of the modules of a portion of the system architecture.

The tag service 112 may record each activity related to tagging in a tag database 122. In an alternate embodiment, the tag database 122 may comprise several databases. The user interface module 114 includes the software that may provide a front end to users and may incorporate tools for users to view and manage their tags. Referring briefly to FIG. 2, a system user 260 using user device 102 may add and remove tags based on new specifications or change tags if the recording provider is changed through a common user interface 270. The common user interface 270 may be a secured web page that requires a user id and password to ensure that access is only available to legitimate users of the system. Alternatively, the common user interface 270 may be client side software in a client server network that is not implemented on the Internet but rests on local system devices or an Intranet. Furthermore, a common user interface 270 may include both a means to access from the Internet, an Intranet, and client side software application. One purpose to implement multiple configurations may be for added security purposes. For example, the Internet accessible front end may only provide a means to view the current tag information but not to change configuration settings. The client side front end, whether it is implemented as a web page or other client side software, may be referred to as Taggregator. In addition to providing a single point of management for tags, a common user interface 270 provides a user friendly medium for users who are not technical experts in web content management. In one embodiment, the common user interface 270 may have the ability to retrieve all of the tags for a given URL. Thus, a user 102 may input a URL within the common user interface 270 and retrieve all of the tags within the URL. In one embodiment, the retrieval may alert the user 102 with an analysis of the degree of complexity of the tags within the URL. For example, a green indicator may show that everything is working and the tags are properly linked. A yellow indicator may show that there are some issues with the tags and a red indicator may reveal that a large number of tag issues are present. The common user interface 270 may also have a means to make recommendations regarding which tags should be aggregated.

A reporting module 116 (FIG. 1) may be used to create, manage, and update reports. A reporting module 116 may be integrated with a tag database 122 or may be a separate module that is able to communicate and with and retrieve data from the tag database 122. The reporting module 116 may include reporting software (not shown) that can automatically create reports based on the data captured by the tag service 112. Since the tag server 106 is in communication with many other types of servers, such as ad server 108, the reporting module 116 can provide various types of reports based on aggregated data collected by other components in network 150. Such reports will be useful to both online service providers and companies who provide online advertisements. Alternatively, a reporting module 116 may not be implemented. The Tag service 112 might simply inform other reporting services that are not part of the Tag and Beacon aggregator, but are instead parts of other standard suite software.

Some or all of ad server 108, portal server 110, and third-party server 112 may be in communication with each other by way of network 150. The ad server 108 and portal server 110 may each represent multiple linked computing devices, and multiple third-party servers. For example, third-party server 118 may be included in environment 100. Network 150 may be regarded as a public or private network connection or any combination of these, and may include, for example, a DMZ (demilitarized zone), a virtual private network or an encryption or other security mechanism employed over the public Internet.

User devices 102 and 104 are represented by user-interactive devices that typically run browser applications, and the like, to display requested pages received over a network that include advertisements. User devices 102 and 104 may view and manage their tags through a web browser.

Not all of the depicted components in FIG. 1 may be required, however, and some embodiments of the invention may include additional components not shown in FIG. 1. Variations in the arrangement and the type of components may be made without departing from the spirit or scope of the claims as set forth herein. Additional, different or fewer components may be provided.

FIG. 2 is a detailed view of the modules of a portion of the system architecture. The tag server 106 includes a primary tag module 210, a secondary tag module 220, and additional tag modules 230 for subsequent tags, a user interface module 240, and a reporting module 250. Also illustrated in FIG. 2 are a user device 102 where a common user interface 270 may be viewed and a system user 260.

The primary tag module 210 includes software that is configured to allow defining a primary tag. A primary tag replaces all of the tags in a web site. The primary tag may span one pixel on a web page. Defining the primary tag may include defining the settings for the primary tags, who has access to the primary tag, who can change it, what the name of the primary tag will be, etc. Once the primary tag is defined, all of the secondary tags must be defined.

The secondary tag module 220 includes software with the ability to define the secondary tags. All of the tags that were previously individually defined on the web site are now defined as secondary tags with a link to the primary tag. A beacon may be defined as the business idea or implementation of some type of technology that provides the capacity to either navigate somewhere or not from within a web page or web application and a tag is how a beacon is implemented. Typically, beacons are implemented by several tags. With the current invention, there is a single beacon implemented by a single tag with multiple variables assigned to that beacon to perform the same functions as multiple beacons would have previously made.

Custom variables may also be set so that if certain conditions are met, other tags may be called off. An initial report or a tag analysis report may be run initially to retrieve all of the secondary tags, configuration settings and conditional settings currently implemented on the website so that the transitioning process to the primary tag method is simplified. Once a system user 102 has made all of the changes discussed using the common user interface 270, these settings can be saved with an option to replace all of the tags on the web page with code that is generated from the back end of the common user interface 270. The system user 260 must then implement the changes on the website. When a new tag is implemented, the system user 260 can use the common user interface 260 to implement the new tag by creating an additional secondary tag using the Taggregator software.

The additional tag modules 230 for subsequent tags include software with the ability to define the subsequent tags. Subsequent tags may be the same as secondary tags, but they may be placed in a different order. A secondary tag is conjoined to the primary tag, and all tags after the secondary would also be conjoined, and therefore by nature be subsequent to the secondary tag. Subsequent tags may represent a plurality of tags, each added separately, each unique, and each with its own set of requirements and values.

In many cases within the industry, internet traffic reports have one set of data regarding the number of tags that were called while business partners have another set of data regarding the number of tags that were called. This current discrepancy can easily be rectified with reporting features of the Taggregator software. The reporting module 250 may include the software and programming that is able to define and run real time reports of the secondary tags 220. A system user 260 may use the common user interface 270 to retrieve a master report that is an aggregate report of the number of times a primary tag was called and the number of successful calls the primary tag made through each of the secondary tags. This provides an audit tag for the system user 260 to review. The system user 260 can compare the master report with the reports from partners and other sources to ensure the number of calls made and the system user 260 is paying for are accurate. The master report may report the number of times a certain domain was called and thus the system user 260 should only have to pay for that number of hits. Thus, it is no longer a question as to whether or not the webpage was actually loaded. Now, the question may be whether or not the service was called from a third party.

A reporting module 250 may also include sophisticated software that can customize reports for advertisers or other partners or affiliates. For example, one affiliate program may require generating a report every Friday. All of the calls to that affiliate may be stored until Friday and the aggregate report can automatically be sent to the affiliate every Friday. This provides an additional layer of network and server efficiently.

Figure 3:
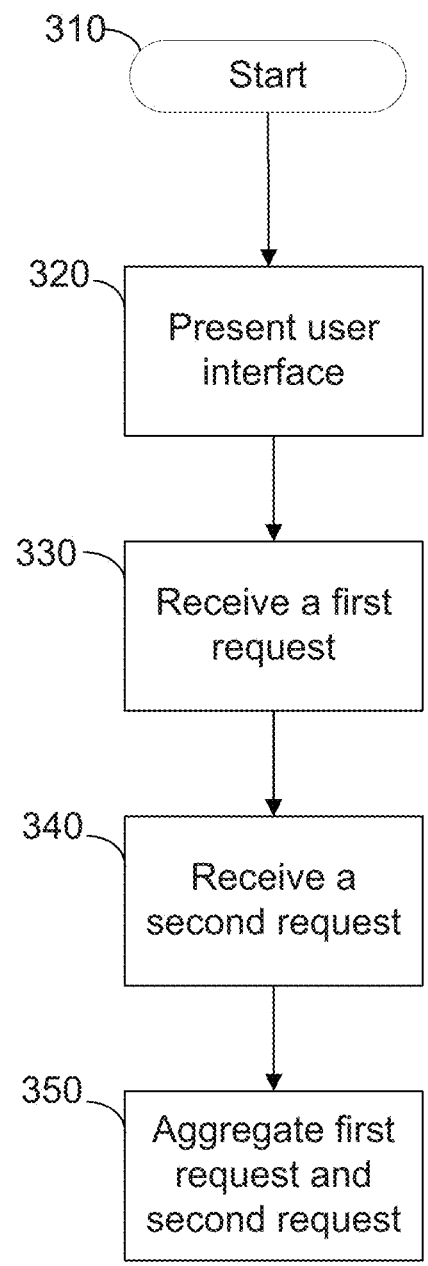
FIG. 3 illustrates the process of implementing primary and secondary tags.

FIG. 3 is flow diagram illustrating the process of implementing primary and secondary tags. Operation begins at block 310. At block 320, a user interface is presented. Next, at block 330, a request is received to implement a primary tag and the primary tag is implemented upon receipt. Next, at block 340, secondary tags are received and implemented. At block 330, the secondary tags are aggregated by adding the necessary tag information options and configuration data from the secondary tag to the primary tag configuration. This configuration remains on the server and is not integrated into the tag so that future edits can be done without changing the implementation code for the tag.

Figure 4:
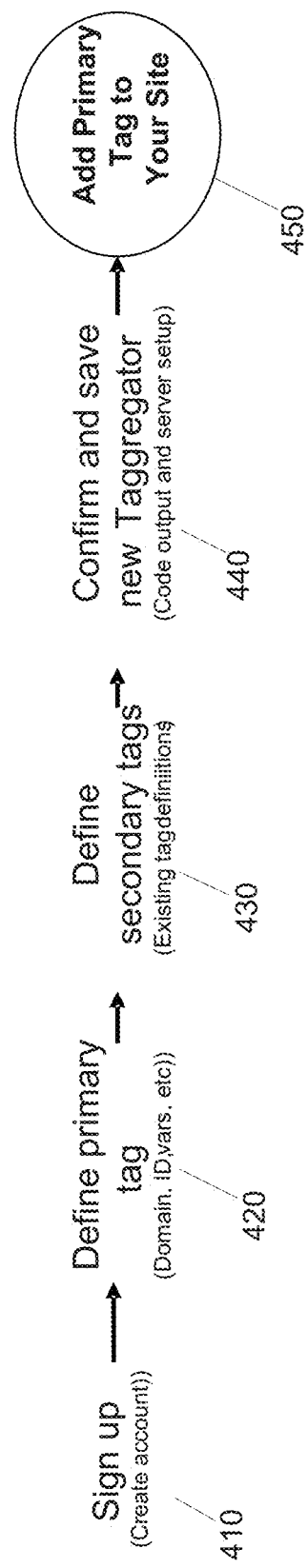
FIG. 4 illustrates a detailed process overview of the current system.

FIG. 4 illustrates a detailed process overview of the current system. At step 410 a user signs up for the Taggregator service. The user may do this through a login procedure or an alternate means. The user then defines primary tags at step 420 such as the domain name and other variables such as the campaign type associated with a primary tag at step 420. If the user is only in charge of managing one website, only one primary tag may be created. A campaign type may be related to an advertisement campaign such as a multi-site campaign or a Smart Ad campaign, or a new promotion. Another variable may be used for revenue tracking and sharing among multiple entities. Furthermore, the primary tag definition may be used for funneling across multiple campaigns.

Next, at step 430, the user defines secondary tags using existing tag definitions. The existing tag definitions may be found as part of the master report previously discussed or any other method that may be in place to determine all of the tags on a given website. Secondary tags may be in place for functions such as website reporting including for example website traffic reporting, campaign reporting, advertisement reporting tags for publishers, advertising reporting tags for advertisement delivery systems, tags associated with affiliate programs, revenue tracking or tags used for any other additional purpose.

Next, at step 440, the user confirms and saves the new tag. Taggregator receives the instruction to save the tag and complies or aggregates the new tag. The Taggregator client side software, web page or other tool may respond with the tag or beacon code necessary to implement the new tags on the user's website. The user can then replace the existing code on the website with the new code created by the Taggregator system. Finally, at step 450, the new primary tag is added to the website. A user can now access the Taggregator system and review reports related to tags.

Figure 5:
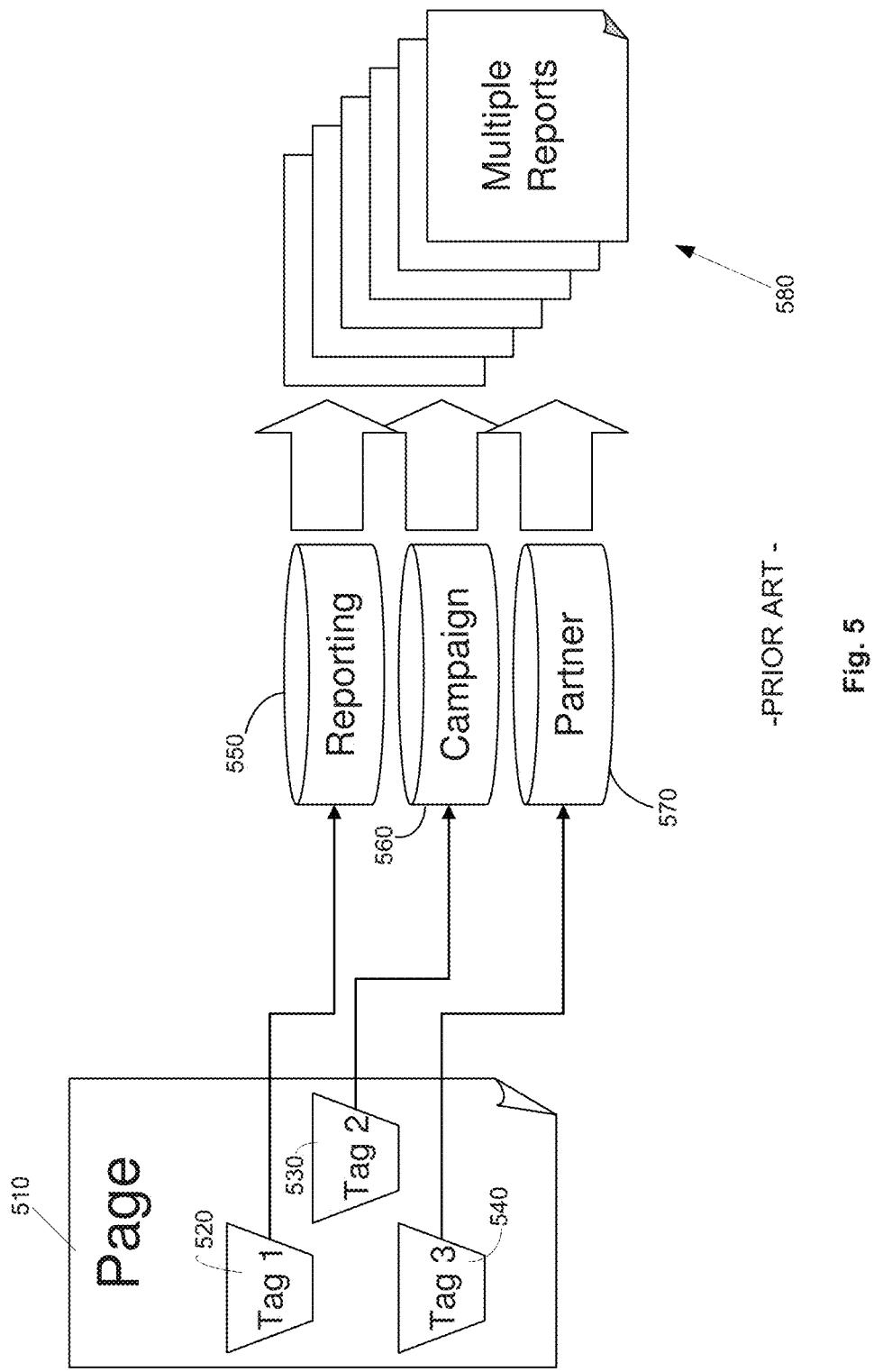
FIG. 5 illustrates prior art implementation of tags and tag reporting.

FIG. 5 illustrates prior art implementation of tags and tag reporting. FIG. 5 includes a web page 510, a reporting module 550, a campaign module 560, a partner module 570 and multiple reports 580. Web page 510 may include tag1 520, tag2 530, and tag3 540. In FIG. 5, each call to tag1 520, tag2 530, and tag3 540 is implemented synchronously. That is, every call must be validated and thus wait for a response of success. In prior art systems, a call to a tag such as tag1 520 is not enough. A successful response must be returned for the web page to be loaded.

In one implementation on the tag server 106 (FIG. 1) side, all of the tags on the website are generated as one primary tag. That primary tag calls the Taggregator service 112 in real time. The Taggregator service 112 then makes latent calls to every partner of the primary website in order for the partner's current internal reporting to continue to exist. A latent call, as used here, refers to a waiting period between the time the call is first made and the time execution of the call begins. At the same time, an aggregate report may be made for all of the calls that were made on behalf of the service.

Figure 6:
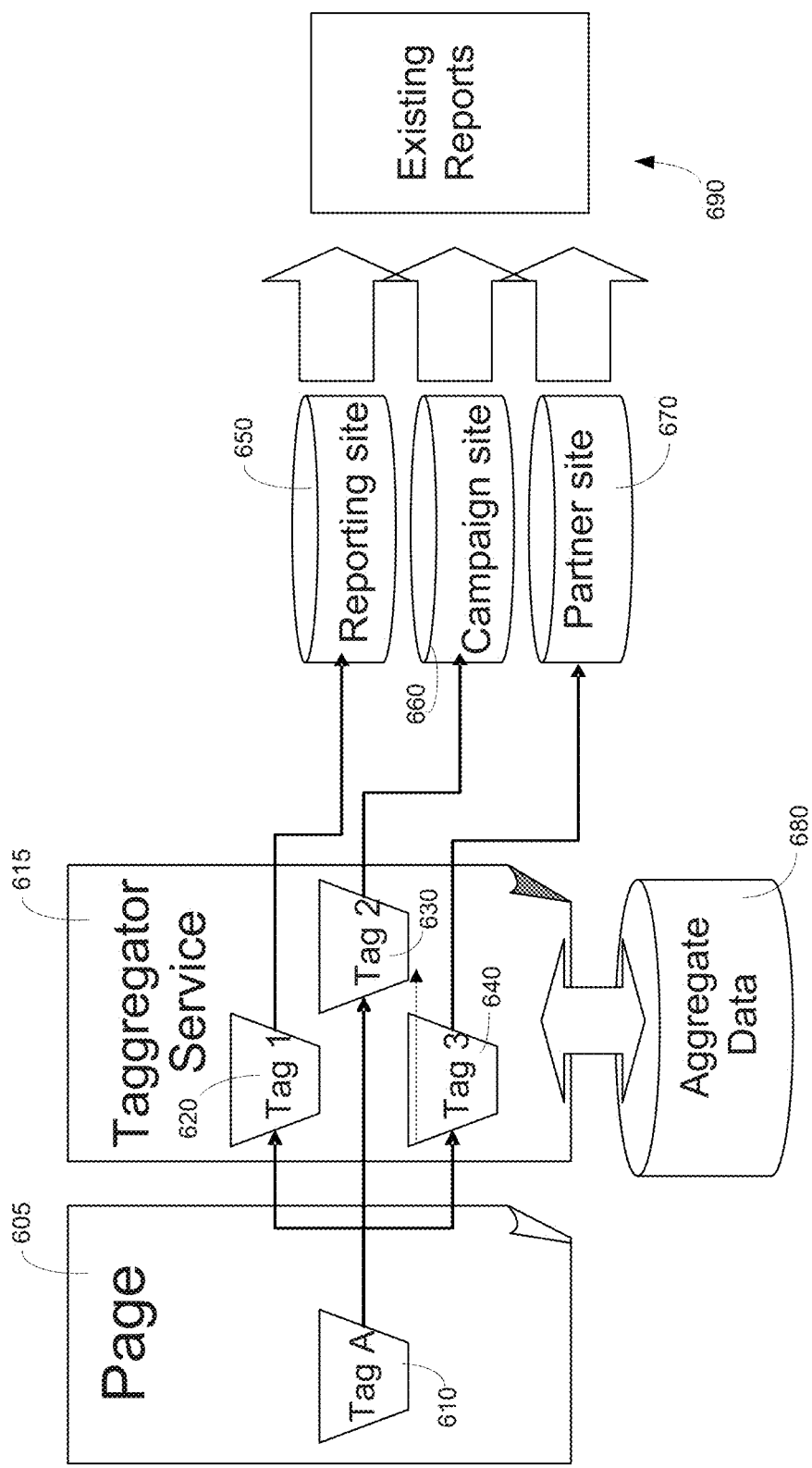
FIG. 6 illustrates the new implementation of tags and tag reporting.

FIG. 6 illustrates the new implementation of tags and tag reporting. FIG. 6 includes a web page 605 having TagA 610, the Taggregator service 615 including tags Tag1 620, Tag2 630 and Tag3 640, Aggregate reporting module 680 coupled with the Taggregator service 615, a reporting module 650, a campaign module 660, and a partner module 670 and existing reports 690. In FIG. 6, there is one real-time call with multiple latent informs.

In this example, campaign is intended to represent a temporary event with unique reporting requirements and tracking configuration. A campaign, such as a limited time advertising campaign, or a temporary or seasonal promotion, could have its tracking requirements facilities by aggregating the tags required, and these could be removed once the campaign is complete.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A system comprising a computer programmed to implement:
a tag service operative to:
divide information from a tag on a web page into a plurality of asynchronous calls, associated with completion of rendering of the web page, comprising a first asynchronous call and a second asynchronous call; and
send each of the plurality of asynchronous calls to one or more remote services that need to be called in order to generate one or more reports in latent, background processes independently of and concurrently with the rendering of the web page, wherein the sending comprises sending the first asynchronous call to a first remote service and sending the second asynchronous call to a second remote service, wherein the first remote service and the second remote service need to be called in order to generate the one or more reports; and
a reporting module operative to:
produce an aggregate report indicative of:
a number of times a real-time call for loading of the web page was made to the tag service; and
a number of successful latent calls made by the tag service to the one or more remote services that need to be called in order to generate the one or more reports.

2. The system of claim 1 wherein the computer is programmed to execute the tag service in response to a selection on the web page.

3. The system of claim 1 further comprising a user interface module programmed to present a user interface for access to the tag service by a user device.

4. The system of claim 3 wherein the user interface is programmed to receive from the user device:
tag data defining the tag; and
aggregated tag data for a plurality of secondary tags, respective secondary tags of the plurality of secondary tags including existing tag data for tags previously defined on the web page and replaced by the tag, the respective secondary tags including a logical link to the tag.

5. The system of claim 4
the reporting module programmed to receive a user report request from the user device and, in response to the user report request, produce the aggregate report.

6. A method comprising:
at a computing device forming a tag server to implement a tag service to manage tags on web pages served to user devices,
receiving at the tag server a call to a primary tag to load a web page on a user device;
in response to the received call:
identifying, in the tag service, secondary tags, including a first secondary tag and a second secondary tag, associated with the primary tag, wherein the secondary tags are not included in the web page;
determining one or more remote sources defined by each of the secondary tags, wherein determined remote sources comprise a first remote source defined by the first secondary tag and a second remote source defined by the second secondary tag; and
making latent calls from the tag server for additional data to the one or more remote sources defined by each of the secondary tags, wherein the making latent calls comprises making a first latent call from the tag server for additional data to the first remote source and making a second latent call from the tag server for additional data to the second remote source; and
produce an aggregate report indicative of:
a number of times the primary tag was called; and
a number of successful calls the primary tag made through each of the secondary tags.

7. The method of claim 6 wherein the making latent calls to the one or more remote sources comprises sending information from the primary tag to a plurality of background processes which run independently of the loading of the web page.

8. The method of claim 6 further comprising:
receiving a request from an advertiser device; and
in response to the request, providing user interface data to the advertiser device to present to the advertiser device data defining a user interface.

9. The method of claim 8 further comprising:
receiving from the advertiser device primary tag data defining the primary tag;
receiving from the advertiser device secondary tag data defining the secondary tags; and
storing the primary tag data and the secondary tag data in memory for subsequent access.

10. The method of claim 6 further comprising:
providing the aggregate report to a system user for comparison to one or more reports from the one or more remote sources.

11. The method of claim 6 wherein the one or more remote sources need to be called in order to generate one or more reports.

12. The method of claim 6 further comprising:
collecting information from the primary tag;
dividing the information from the primary tag into two or more respective asynchronous calls to the one or more remote sources;
communicating the two or more respective asynchronous calls to the respective sources in latent, background processes; and
separately from the communicating, loading the web page.

13. A method comprising:
executing a tag service in response to a selection on a web page, the tag service operative to perform operations comprising:
dividing information from a tag on the web page into a plurality of asynchronous calls, associated with completion of rendering of the web page, comprising a first asynchronous call and a second asynchronous call;

sending each of the plurality of asynchronous calls to one or more remote services in latent, background processes, wherein the sending comprises sending the first asynchronous call to a first remote service and sending the second asynchronous call to a second remote service; and producing an aggregate report indicative of:
a number of times a real-time call for loading of the web page was made; and
a number of successful latent calls made to the one or more remote services.

14. The method of claim 13 wherein the sending each of the plurality of asynchronous calls comprises sending each of the plurality of asynchronous calls independently of the rendering of the web page by a user device.

15. The method of claim 13 further comprising:
providing the aggregate report to a system user for comparison to one or more reports from one or more remote sources.

16. The method of claim 13 further comprising:
presenting a user interface for access to the tag service by a user device.

17. The method of claim 16 wherein the user interface is programmed to receive from the user device:
tag data defining the tag; and
aggregated tag data for a plurality of secondary tags.

18. The method of claim 17 wherein respective secondary tags of the plurality of secondary tags include existing tag data for tags previously defined on the web page and replaced by the tag, the respective secondary tags including a logical link to the tag.

19. The method of claim 18 further comprising:
receiving a user report request from the user device.

20. The method of claim 19 further comprising:
in response to the user report request, producing the aggregate report of.

* * * * *